United States Patent
Chung et al.

(10) Patent No.: US 12,380,031 B2
(45) Date of Patent: Aug. 5, 2025

(54) METHOD AND APPARATUS FOR DESIGNING CACHE MEMORY STRUCTURE BASED ON ARTIFICIAL INTELLIGENCE

(71) Applicant: UIF (University Industry Foundation), Yonsei University, Seoul (KR)

(72) Inventors: Eui Young Chung, Seoul (KR); Min Jung Cho, Seoul (KR); Sang Hyup Lee, Seoul (KR); Do Hyeon Kim, Seoul (KR); Seong Jae Eom, Seoul (KR)

(73) Assignee: UIF (University Industry Foundation), Yonsei University, Seoul (KR)

( * ) Notice: Subject to any disclaimer, the term of this patent is extended or adjusted under 35 U.S.C. 154(b) by 0 days.

(21) Appl. No.: 18/399,517

(22) Filed: Dec. 28, 2023

(65) Prior Publication Data

US 2024/0220413 A1   Jul. 4, 2024

(30) Foreign Application Priority Data

Dec. 29, 2022   (KR) .......................... 10-2022-0189714

(51) Int. Cl.
  *G06F 12/0877*   (2016.01)
  *G06F 12/0893*   (2016.01)
(52) U.S. Cl.
  CPC ...... *G06F 12/0877* (2013.01); *G06F 12/0893* (2013.01)
(58) Field of Classification Search
  CPC .. G06F 12/0877; G06F 12/0893; G06F 30/27; G06F 30/33; G06F 30/337; G06F 30/398; G06N 20/00
  See application file for complete search history.

(56) References Cited

U.S. PATENT DOCUMENTS

2002/0156980 A1* 10/2002 Rodriguez ............ G06F 12/121
  711/E12.07
2002/0194432 A1* 12/2002 Rodriguez ............ G06F 12/123
  711/E12.07

(Continued)

FOREIGN PATENT DOCUMENTS

KR   10-2018-0014992 A   2/2018
KR   10-2022-0081276 A   6/2022

OTHER PUBLICATIONS

Office Action for KR 10-2022-0189714 by Korean Intellectual Property Office dated Mar. 14, 2025.

(Continued)

*Primary Examiner* — Aracelis Ruiz
(74) *Attorney, Agent, or Firm* — BROADVIEW IP LAW, PC

(57) ABSTRACT

Disclosed are a method for designing a cache memory structure of an artificial intelligence accelerator and an apparatus therefor. A method for designing a structure of a cache memory of an accelerator in a cache memory structure designing apparatus is a cache memory structure designing method including a memory access information extracting step of extracting a memory address of a cache memory accessed by a processing element array (PE array) at every time stamp for an application input to the accelerator, a memory access pattern determining step of determining a memory access pattern for the application based on the memory addresses of the cache memory accessed over time, and a cache structure design step of deriving a cache memory structure using a cache structure design model trained in advance based on a memory access pattern and generating cache structure design information for the cache memory structure.

13 Claims, 15 Drawing Sheets

(56) References Cited

U.S. PATENT DOCUMENTS

2013/0346056 A1* 12/2013 Amirkhanyan ....... G06F 30/398
                                                               703/14
2019/0303297 A1   10/2019   Fleming, Jr. et al.
2020/0342284 A1   10/2020   Buyuktosunoglu et al.

OTHER PUBLICATIONS

Navarro, Osvaldo et al. (2020), "A Machine Learning Methodology for Cache Memory Design Based on Dynamic Instructions", ACM Transactions on Embedded Computing Systems, vol. 19, No. 2, Article 12., doi.org/10.1145/3376920.

* cited by examiner $d_i = idx$
$if \ |buffer_i[window - idx] - z| = 0 \quad for \ idx = 1, \cdots, window$

FIG. 13

| Locality type | Total access count | Access count by allocating warp |
|---|---|---|
| streaming | 1 | 1 |
| Inter-warp | N (>1) | 1 |
| Intra-warp | N (>1) | N |

METHOD AND APPARATUS FOR DESIGNING CACHE MEMORY STRUCTURE BASED ON ARTIFICIAL INTELLIGENCE

CROSS-REFERENCE TO RELATED APPLICATIONS

This application claims priority to and the benefit of Korean Patent Application No. 10-2022-0189714 filed in the Korean Intellectual Property Office on Dec. 29, 2022, the entire contents of which are incorporated herein by reference.

TECHNICAL FIELD

The present disclosure relates to a method and an apparatus for designing a cache memory structure based on an artificial intelligence accelerator.

BACKGROUND ART

The contents described in this section merely provide background information on the exemplary embodiment of the present disclosure, but do not constitute the related art.

Recently, a number of accelerators equipped with a processing element (PE) array and a cache memory for quickly processing various operations is being developed. The processing element array is an array of processing elements (core processors) suitable for parallel operation and acquires data required for an operation by accessing a specific storage space of a cache memory.

Accordingly, in order to process an optimized low power and high performance accelerator, it is necessary to appropriately design a structure of a cache memory in advance according to the specific operation. Specifically, in the case of a high complexity, like an artificial intelligence accelerator, it is important to reduce a runtime of each step or reduce a number of repetitions of the entire flow to shorten the development period.

However, according to a general method of designing a cache memory, a designer designs a cache structure of the accelerator according to the experience or intuition so that there are problems in that it takes a lot of time and costs and it is difficult to design an optimal cache memory structure.

Accordingly, a method for automatically designing a structure of a cache memory using artificial intelligence is necessary.

SUMMARY OF THE INVENTION

A main object of the present disclosure is to provide a method and an apparatus for designing a cache memory structure of an artificial intelligence accelerator which extract a memory access pattern according to a predetermined application which is processed in an artificial intelligence accelerator and automatically design an optimal cache memory structure using a cache structure design model which is trained in advance based on the extracted memory access pattern.

According to an aspect of the present disclosure, In order to achieve the above-described objects, a method for designing a structure of a cache memory of an accelerator, in a cache memory structure designing apparatus is a cache memory structure designing method including a memory access information extracting step of extracting a memory address of a cache memory accessed by a processing element array (PE array) at every time stamp for an application input to the accelerator, a memory access pattern determining step of determining a memory access pattern for the application based on the memory addresses of the cache memory accessed over time, and a cache structure design step of deriving a cache memory structure using a cache structure design model trained in advance based on a memory access pattern and generating cache structure design information for the cache memory structure.

Further, according to another aspect of the present disclosure, In order to achieve the above-described objects, a cache memory structure designing apparatus for designing a structure of a cache memory of an accelerator is a cache memory structure designing apparatus including a memory access information extracting unit which extracts a memory address of a cache memory accessed by a processing element array (PE array) at every time stamp for an application input to the accelerator; a memory access pattern determining unit which determines a memory access pattern for the application based on the memory addresses of the cache memory accessed over time; and a cache structure design unit which derives a cache memory structure using a cache structure design model trained in advance based on a memory access pattern and generates cache structure design information for the cache memory structure.

Further, according to another aspect of the present disclosure, In order to achieve the above-described objects, an accelerator system includes a memory, a host processor which controls execution of an application in an accelerator; an accelerator which includes a processing element array (PE array) which performs an operation processing for the application and a cache memory interworking with the processing element array; and a cache memory structure designing apparatus including: a memory access information extracting unit which extracts a memory address of a cache memory accessed by a processing element array (PE array) at every time stamp for an application input to the accelerator, a memory access pattern determining unit which determines a memory access pattern for the application based on the memory addresses of the cache memory accessed over time; and a cache structure design unit which derives a cache memory structure using a cache structure design model trained in advance based on a memory access pattern and generates cache structure design information for the cache memory structure.

As described above, according to the present disclosure, a cache structure automation designing method is used to derive a low power and high performance cache structure which is optimized for a specific accelerator.

Further, according to the present disclosure, generally, a time or a human resource for designing a cache of an accelerator is reduced.

Further, according to the present disclosure, it is possible to expect gains in terms of a chip area and a leakage power by changing the structure from a single memory cache memory to a hybrid cache memory structure applying two memories.

BRIEF DESCRIPTION OF THE DRAWINGS

FIGS. 13 and 14 are views for explaining an operation of generating a third feature matrix based on a memory access pattern according to an exemplary embodiment of the present disclosure.

DETAILED DESCRIPTION

Hereinafter, exemplary embodiments of the present disclosure will be described in detail with reference to the accompanying drawings. In the description of the present disclosure, if it is considered that the specific description of related known configuration or function may cloud the gist of the present disclosure, the detailed description will be omitted. Further, hereinafter, exemplary embodiments of the present disclosure will be described. However, it should be understood that the technical spirit of the invention is not restricted or limited to the specific embodiments, but may be changed or modified in various ways by those skilled in the art to be carried out. Hereinafter, a cache memory structure designing method of an artificial intelligence accelerator and an apparatus therefor proposed by the present disclosure will be described in detail with reference to drawings.

Figure 1:
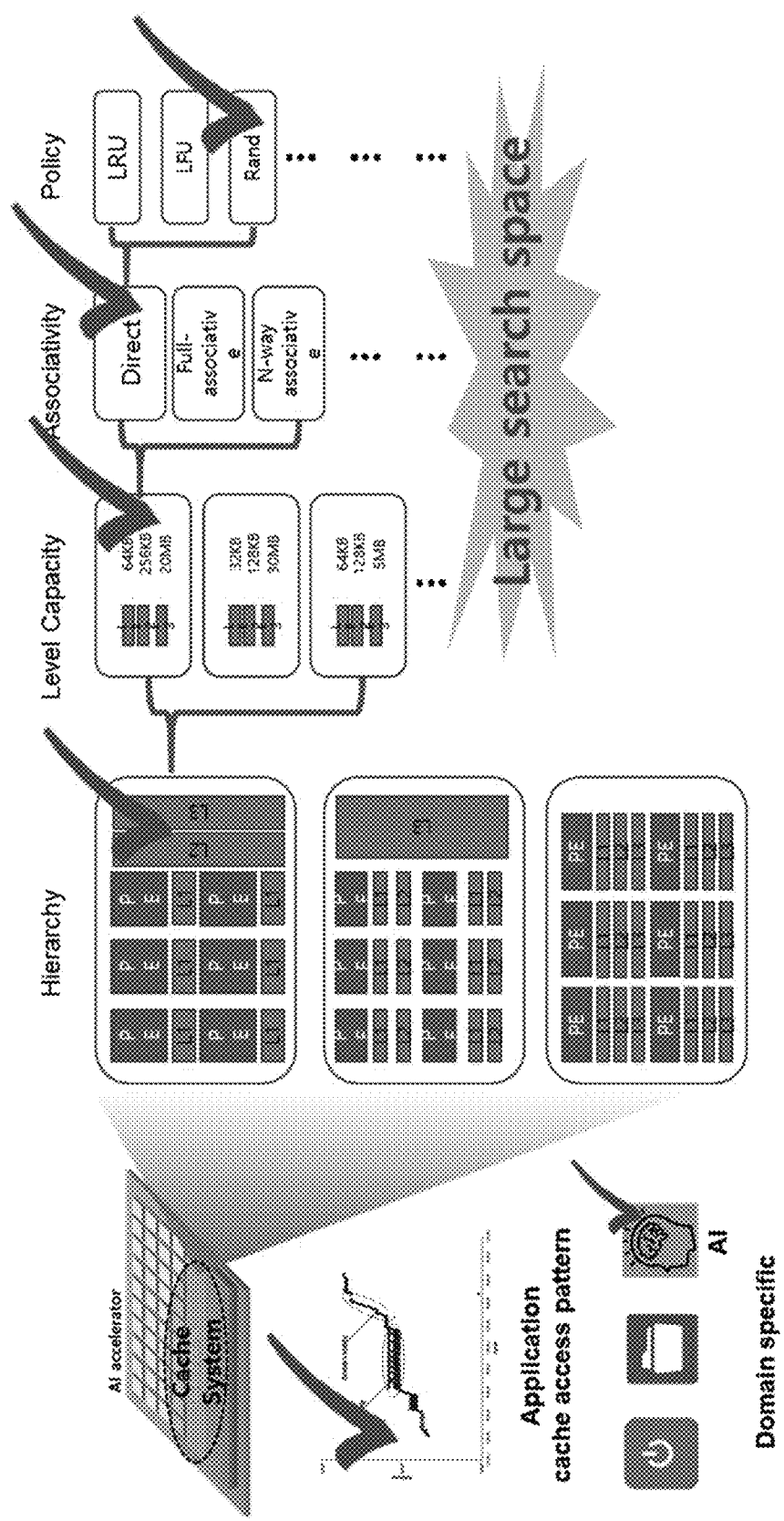
FIGS. 1 and 2 are views for explaining an operation of designing a cache structure according to an exemplary embodiment of the present disclosure.
Figure 2:
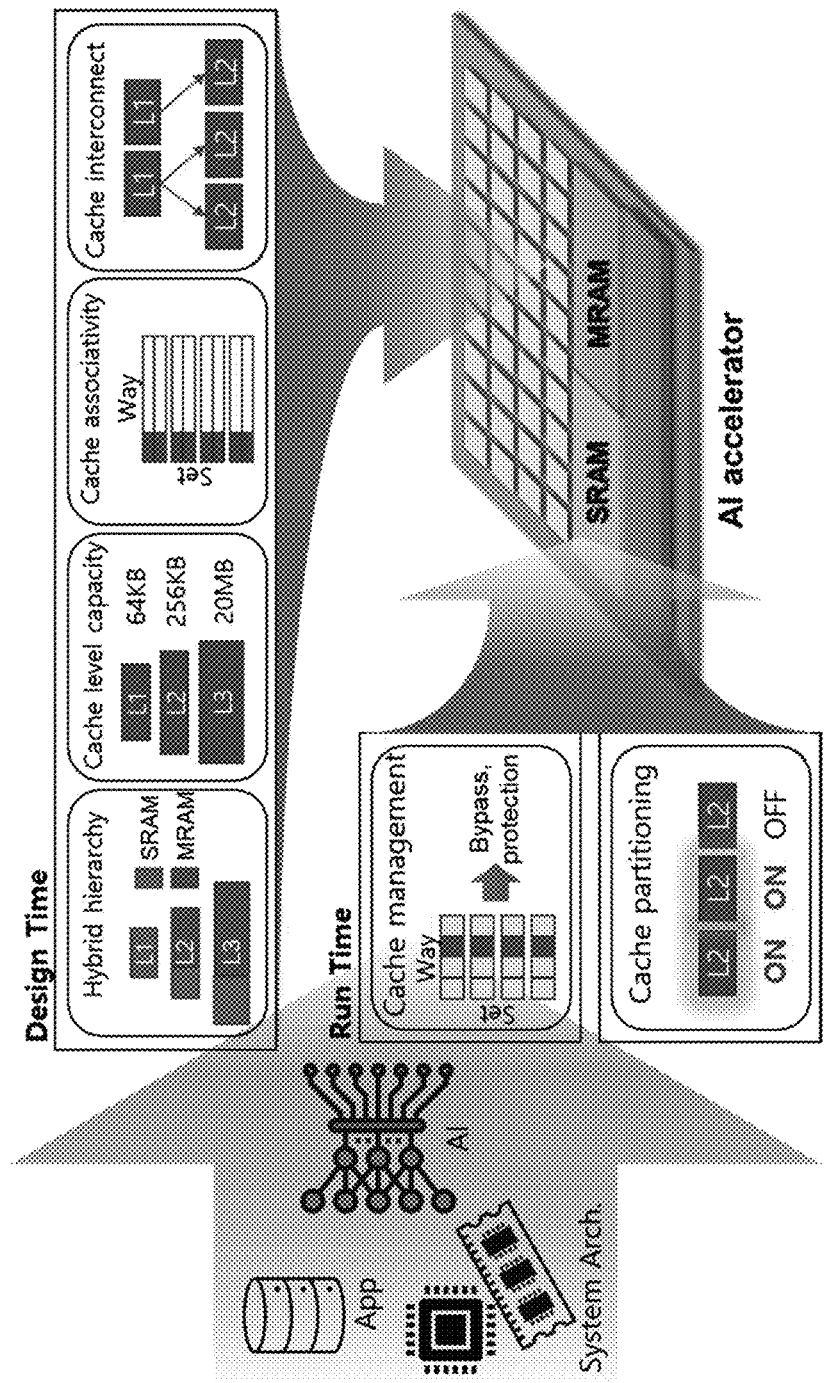

FIGS. 1 and 2 are views for explaining an operation of designing a cache structure according to an exemplary embodiment of the present disclosure, A cache memory structure designing apparatus 50 according to the present exemplary embodiment designs a cache structure of a cache memory 200.

To design a cache structure is to determine at least one of a memory hierarchy, a capacity of each level storage space of the cache memory 200 (cache level capacity), a configuration of an associative memory of the cache memory 200, and a policy of the cache memory 200.

The cache structure designing method of the related art relies on the designer's experience to consume a lot of manpower, time, and costs.

In contrast, according to the present disclosure, an optimal cache structure for a cache access pattern of a specific application may be derived by an artificial intelligence based cache memory automation designing method.

In the present disclosure, in order to design a cache structure, an optimized cache structure is searched in consideration of a locality of the cache memory and a locality for a processor group according to a characteristic of a hybrid cache memory. Here, the hybrid cache memory is desirably a SRAM-MRAM hybrid cache memory, but is not necessarily limited thereto.

The cache memory structure designing apparatus 50 designs at least one of a memory hierarchy of the cache memory 200, a capacity of each level storage space of the cache memory 200, a configuration of an associative memory of the cache memory 200, and a policy of the cache memory 200 using a cache structure design model, based on the memory access pattern.

In the meantime, as a target to be determined or considered when the cache memory structure designing apparatus 50 designs a cache structure of the cache memory 200, it is not necessarily limited to the memory hierarchy, the capacity of each level storage space, the configuration of an associative memory, and the policy of the cache memory 200 which have been described above. Accordingly, as long as the structure of the cache memory 200 is designed using the cache structure design model based on the memory access pattern, any element of the cache memory 200 may be determined during the process of designing a cache memory according to one exemplary embodiment.

Figure 3:
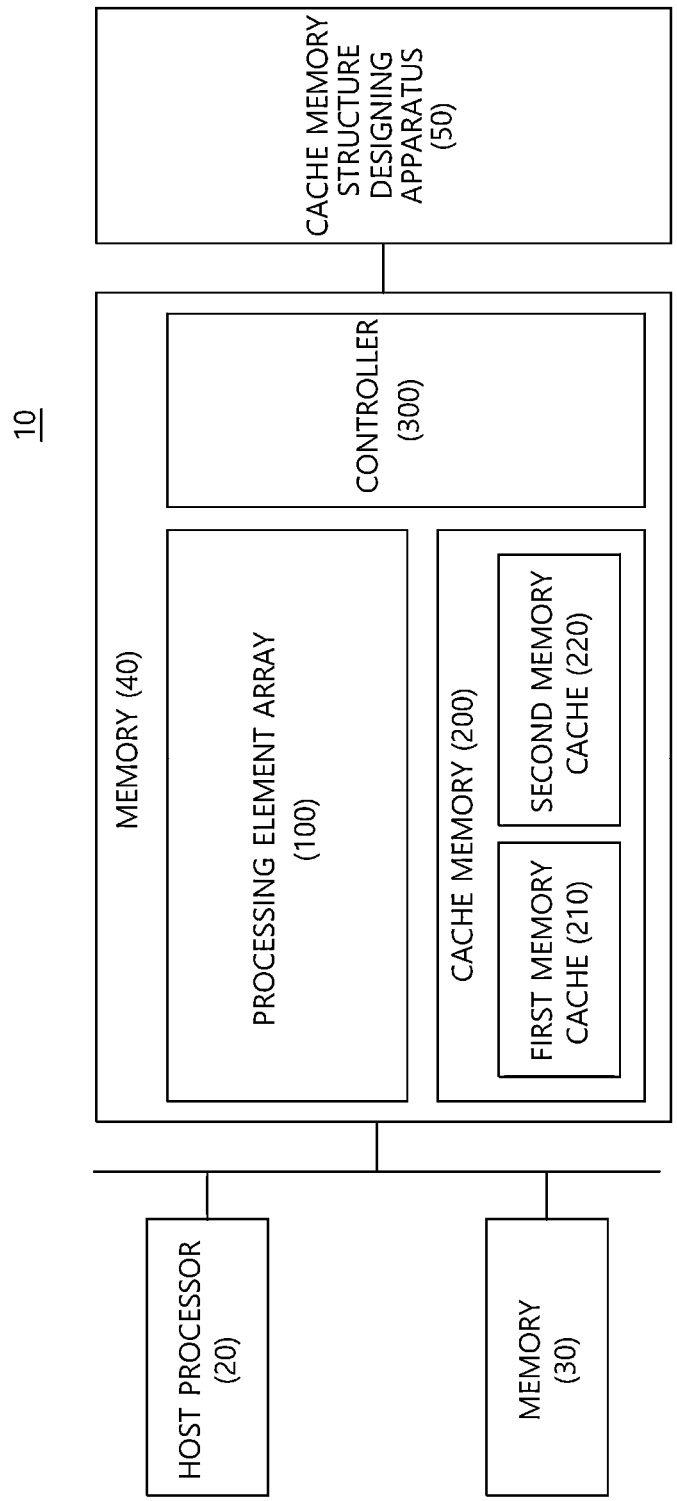
FIG. 3 is a block diagram schematically illustrating an accelerator system according to an exemplary embodiment of the present disclosure.

FIG. 3 is a block diagram schematically illustrating an accelerator system according to an exemplary embodiment of the present disclosure.

The accelerator system 10 according to the exemplary embodiment includes a host processor 20, a memory 30, an accelerator 40, and a cache memory structure designing apparatus 50. The accelerator system 10 of FIG. 1 is an example so that all blocks illustrated in FIG. 1 are not essential components and in the other exemplary embodiment, some blocks included in the accelerator system 10 may be added, modified, or omitted.

The host processor 20 is a device which controls operations of configurations included in the accelerator system 10 and for example, includes a central processing unit (CPU).

The host processor 20 controls the operation of the accelerator 40 and allocates one or more workloads to the accelerator 40. The workload includes an instruction which allows the accelerator 40 to execute applications for a neural network for object recognition, voice recognition, pattern recognition, computer vision, and machine translation. The host processor 20 allocates one or more workloads to the accelerator 40 according to one or more requested tasks.

The memory 30 is a memory disposed at the outside of the accelerator 40, and for example, may be a memory which is utilized as a main memory of the accelerator system 10. Here, the memory 30 may be a DRAM, but is not necessarily limited thereto and may be implemented by various types of memories.

The accelerator 40 refers to an artificial intelligence accelerator which executes an application for a neural network according to the assigned workload to infer data to be input.

The accelerator 40 may be a separate processor which is different from the host processor 20. In other words, the accelerator 40 simultaneously performs one or a plurality of workloads assigned by the host processor 20.

The accelerator 40 includes a processing element array 100, a cache memory 200, and a controller 300.

The processing element array 100 includes a plurality of processing elements and is arranged to perform parallel processing.

The processing element array 100 includes a processor group which is grouped in a unit including at least one processing element. The plurality of processor groups is grouped in blocks.

Here, each processing element may be a streaming processor or a core processor, the processor group may be a warp, and the block may be a streaming multiprocessor (SM), but are not necessarily limited thereto.

The processing element array 100 receives a neural network based application to acquire data required to perform the application from the cache memory 200. That is, data required to perform a specific application is data stored in a plurality of spaces of the cache memory 200.

The processing element array 100 is hardware specified for a deep neural network (DNN), unlike the CPU and a GPU which process general-purpose applications, but is not limited hereto.

The processing element array 100 accesses a storage space at a specific memory address in which necessary data is stored in advance to acquire data. Data required to perform the application may be stored in a plurality of storage spaces in the cache memory 200. In order to acquire data as needed over time, the processing element array 100 repeats a process of acquiring data by accessing a storage space at a specific memory address and then acquiring next necessary data by accessing a storage space at another memory address.

The cache memory 200 according to the exemplary embodiment is a hybrid cache memory configured by a first memory cache 210 and a second memory cache 220.

The first memory cache 210 is a cache memory generated based on a first memory and the second memory cache 220 is a cache memory generated based on a second memory. Here, the first memory may be a volatile RAM such as a static random access memory (SRAM) or a dynamic random access memory (DRAM). Further, the second memory may be a non-volatile RAM, such as a ferroelectric RAM (FeRAM), a magnetic RAM (MRAM), a phase change RAM (PRAM), a resistance RAM (ReRAM), a polymer RAM (PoRAM), or a nano floating gate memory (NFGM).

Figure 4:
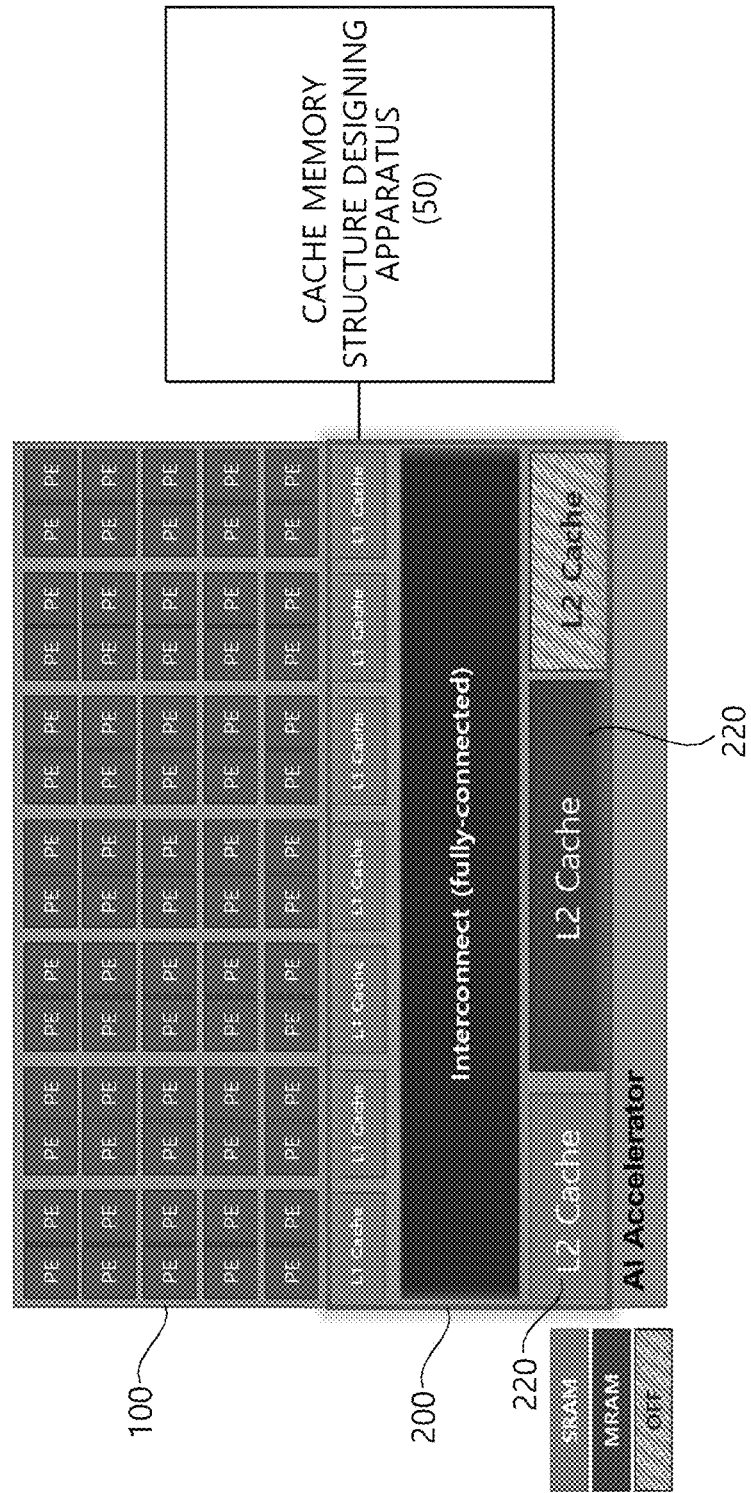
FIG. 4 is a view for explaining a structure of an accelerator according to an exemplary embodiment of the present disclosure.

Referring to FIG. 4, the accelerator 40 according to the present exemplary embodiment is implemented by a processing element array 100 including a plurality of processing elements PE and a cache memory 200.

As illustrated in FIG. 4, the cache memory 200 includes a cache which is implemented by two different memories (for example, SRAM and MRAM), and each cache is implemented by a first level cache L1 and a second level cache L2. Here, a ratio of the number of caches implemented by two different memories may be changed.

The controller 300 is a device which controls an overall operation of the accelerator 40.

When the accelerator 40 operates, the controller 300 performs the control between the processing element array 100 and the cache memory 200.

Further, the controller 300 may be implemented by a direct memory access (DMA) connected to the cache memory 200.

When cache structure design information is acquired from the cache memory structure designing apparatus 500, the controller 300 applies the cache structure design information to the cache memory 200.

Even though it is described that the controller 300 is a single module, the present exemplary embodiment is not necessary limited hereto and the controller may be implemented by a plurality of controllers for control in the accelerator 40.

The cache memory structure designing apparatus 50 performs an operation of automatically designing a cache structure of the cache memory 200 by interworking with the accelerator 40.

The cache memory structure designing apparatus 50 applies a memory access pattern according to the application processed by the accelerator 40 to the cache structure design model to automatically design an optimal cache structure.

Hereinafter, a cache memory structure designing method performed in the cache memory structure designing apparatus 50 will be described.

The cache memory structure designing apparatus 50 performs a memory access information extracting step of extracting a memory address of a cache memory accessed by a processing element array (PE array) at every time stamp for an application input to the accelerator 40.

Further, the cache memory structure designing apparatus 50 performs a memory access pattern determining step of determining a memory access pattern for the application based on the memory addresses of the cache memory accessed over time.

Further, the cache memory structure designing apparatus 50 performs a cache structure design step of deriving a cache memory structure using a cache structure design model trained in advance based on the memory access pattern and generating cache structure design information about the cache memory structure.

In the meantime, the cache memory structure designing apparatus 50 further performs a feature matrix generating step of generating a feature matrix by extracting feature information based on a locality of the memory address from the memory access pattern.

In the cache structure design step, the cache memory structure designing apparatus 50 performs an operation of designing the cache memory structure by inputting the feature matrix for the application to the cache structure design model.

In the feature matrix generating step, the cache memory structure designing apparatus 50 extracts feature information about a plurality of reference time stamps indicating a timing when the processing element array accesses the cache memory, for the application, and collects feature information about all the reference time stamps to generate the feature matrix for the application.

Further, in the feature matrix generating step, the cache memory structure designing apparatus 50 extracts a memory address with a least difference from a memory address accessed at the reference time stamp, among memory addresses accessed at a plurality of consecutive time stamps and collects least difference information about a difference between the memory address accessed at the reference time stamp and the least difference memory address to generate a first feature matrix for the application.

Further, in the feature matrix generating step, the cache memory structure designing apparatus 50 extracts first number information about a number of time stamps accessing the same memory address as a memory address accessed at the reference stamp, among a plurality of consecutive time stamps and collects the first number information about all the reference time stamps to generate a second feature matrix for the application.

Further, in the feature matrix generating step, the cache memory structure designing apparatus 50 extracts feature information based on a locality of the memory address for at least one processor group including a plurality of streaming processors to generate a third feature matrix.

Further, in the feature matrix generating step, the cache memory structure designing apparatus 50 extracts feature information about at least one access count, among an access count for a memory address which is accessed only once and then discarded, an access count obtained by counting memory addresses for accessing between at least one processer group, and an access count obtained by counting memory addresses for accessing the streaming processor in the processor group and collects the feature information to generate the third feature matrix for the application.

Further, in the feature matrix generating step, the cache memory structure designing apparatus 50 extracts feature information about an operation of reading or writing at a memory address accessed by the processor group and about the access count for the frequency of reading or writing at the memory address accessed by the processor group to generate the third feature matrix.

In the meantime, the feature matrix generating step, the cache memory structure designing apparatus 50 generates a feature matrix for the application by any one or a combination of two or more of the first feature matrix, the second feature matrix, and the third feature matrix.

Components included in the cache memory structure designing apparatus 50 will be described with reference to FIG. 5.

Figure 5:
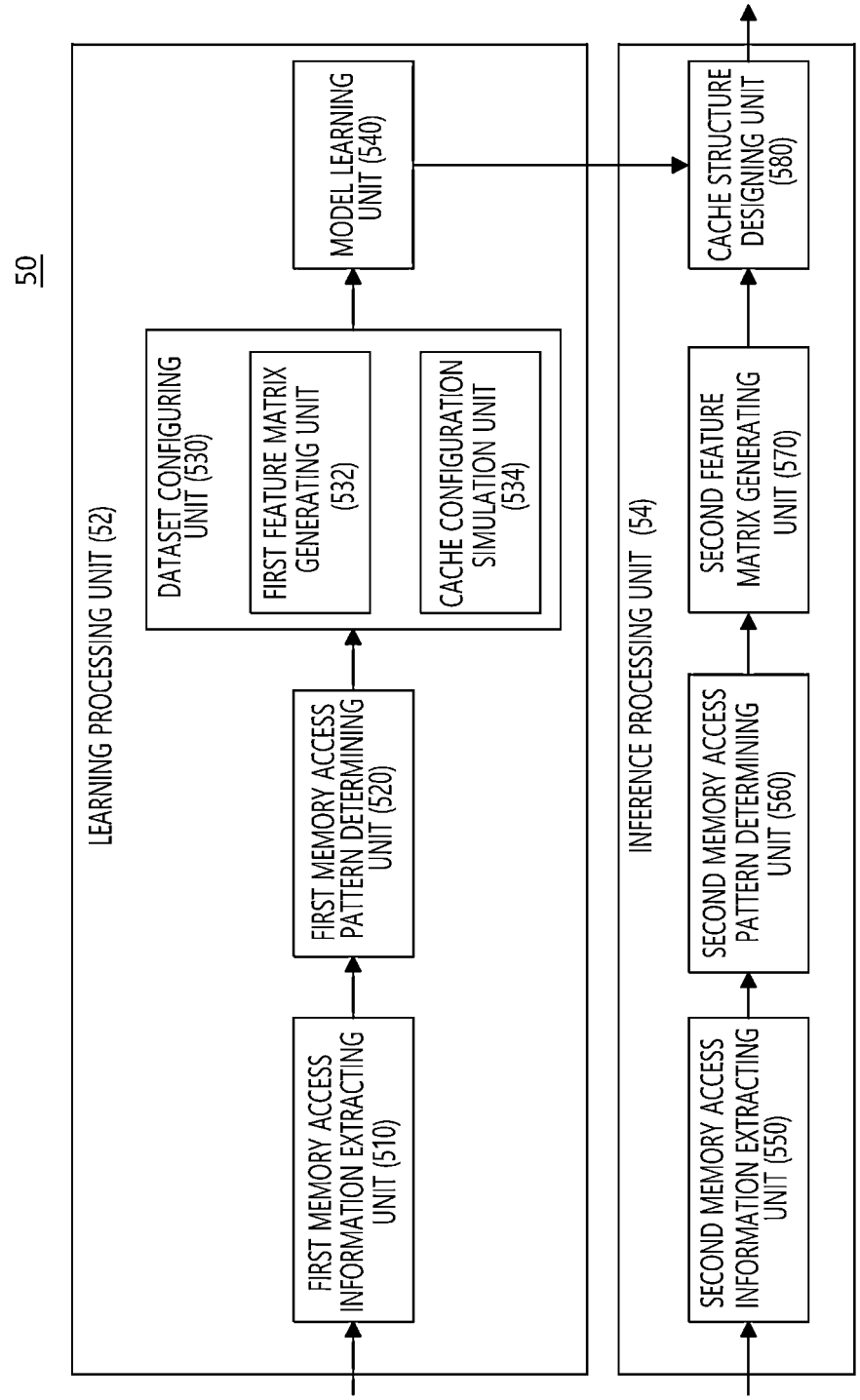
FIG. 5 is a block diagram schematically illustrating a cache memory structure designing apparatus according to an exemplary embodiment of the present invention.

FIG. 5 is a block diagram schematically illustrating a cache memory structure designing apparatus according to an exemplary embodiment of the present invention.

The cache memory structure designing apparatus 50 performs an operation of automatically designing a cache structure of the cache memory 200 by interworking with the accelerator 40.

The cache memory structure designing apparatus 50 applies a memory access pattern according to the application processed by the accelerator 40 to the cache structure design model to automatically design an optimal cache structure.

When a structure of the cache memory 200 is designed to be optimized for an application input to the accelerator 40, an optimized low power and high performance cache structure suitable for a specific processing element array 100 may be derived. However, according to a general method for designing the cache memory 200, a cache suitable for the processing element array 100 is designed based on the experience of the designer so that there is a problem in that a lot of time and costs are consumed. Specifically, in the case of the cache memory 200 for the processing element array 100 having a high complexity, like an AI accelerator, it is important to reduce a runtime of each step or reduce a number of repetitions of the entire flow to shorten the development period.

The cache memory structure design device 50 according to the present disclosure may design a configuration (cache configuration) for a cache structure for an application using a cache structure design model which has been trained in advance based on a memory access pattern. Here, the cache structure design model is a deep learning model trained by machine learning.

Consequently, the cache memory structure designing apparatus 50 according to the present disclosure may automatically design an optimal or high performance cache memory structure by an artificial intelligence based designing method, unlike the existing method which relies on the designer's experience or intuition.

The cache memory structure designing apparatus 50 according to the present disclosure includes a learning processing unit 52 and an inference processing unit 54.

The learning processing unit 52 performs an operation of generating a cache structure design model using a learning application input to the accelerator 40. Here, the learning application is desirably an application for a neural network input to generate a model, but is not necessarily limited thereto and generally, may be an application which is input to the accelerator 40.

Hereinafter, components included in the learning processing unit 52 according to the exemplary embodiment will be described.

The first memory access information extracting unit 510 may extract a memory address of the cache memory 200 which is accessed by a processing element array 100 at every time stamp, for the input learning application. Here, the time stamp may be a string which represents or records a specific time. Specifically, the time stamp refers to a time when an event is recorded in a computer.

The processing element array 100 sequentially accesses a plurality of memory addresses over time so that the first memory access information extracting unit 510 acquires information of memory addresses of a storage space accessed by the processing element array 100 at each time stamp.

The first memory access pattern determining unit 520 determines a memory access pattern for the learning application, based on the access addresses accessed by the processing element array 100 over time.

The memory access pattern may be a tendency or a pattern of the memory address accessed by the processing element array 100 for a specific application, according to the flow of the time stamp. Accordingly, even though the same processing element array 100 accesses the same cache memory 200, the memory access pattern may vary depending on a type of the application.

Further, depending on how to design a configuration for the structure of the cache memory 200 in advance, even though the same processing element array 100 accesses the same cache memory 200 for the same application, the memory access pattern may be totally different.

A data set configuring unit 530 performs an operation of configuring a dataset for training the cache structure design model. Here, the dataset may include a feature matrix generated based on the memory access pattern and label information generated by a cache configuring simulation.

The dataset configuring unit 530 according to the exemplary embodiment includes a first feature matrix generating unit 532 and a cache configuration simulation unit 534.

The first feature matrix generating unit 532 extracts feature information based on a locality of the memory address from the memory access pattern to generate a feature matrix.

Here, the feature matrix may be a feature generated based on features of memory addresses accessed by the processing element array 100 within a predetermined time stamp range, for each of a plurality of reference time stamps. For example, the feature matrix may represent features of how much or frequently the processing element array 100 accesses the storage space of adjacent memory addresses, but is not limited thereto. The feature matrix may be eventually generated one for each application.

Further, the first feature matrix generating unit 532 extracts feature information based on the locality of the memory address for at least one processor group including a plurality of streaming processors of the processing element array 100 to generate a feature matrix.

The cache configuration simulation unit 534 generates label information labeled to the memory access pattern by simulating the measurement of a performance for every configuration of the cache structure. Here, the label information is information in which a level value obtained by measuring the performance is assigned to every memory access pattern for every application.

The cache configuration simulation unit 534 measures the performance by applying configurations of various cache structures and performs the labeling to label the learning dataset.

The model learning unit 540 trains a cache structure design model using a method of reducing a loss function through iterative machine learning.

The cache structure design model trained in the model learning unit 540 is transmitted and stored to the inference processing unit 54 and is also stored in the memory 30 of the accelerator system 10.

Further, the machine learning performed in the model learning unit 540 refers that a model configured by a plurality of parameters is used and a parameter is optimized with given data. The machine learning includes supervised learning, unsupervised learning, and reinforcement learning, depending on a type of the learning problem. The supervised learning learns mapping between inputs and outputs and is applied when an input and output pair is given as data. The unsupervised learning is applied when an input is given, but an output is not given, and according to the unsupervised learning, a regularity between inputs may be found. However, the machine learning according to the exemplary embodiment is not necessarily limited to the above-mentioned learning method.

The model learning unit 540 learns a cache structure design model in various modes. For example, the model learning unit 540 learns a feature extracted from addresses of the memory accessed by the processing element array 100 over time, for a plurality of learning applications, by a deep learning based learning method.

At this time, in order to learn a method of extracting a feature, that is, a feature matrix, from an address of the memory accessed by the processing element array 100 over time, a convolutional neural network (CNN) structure in which a plurality of steps of convolution layers is stacked may be utilized. However, the learning method of the model learning unit 540 is not necessary limited to the method of utilizing the CNN structure.

For example, the model learning unit 540 may perform the machine learning by utilizing a graph neural network (GNN) structure which quickly predicts an optimal topology between computing system components and any artificial neural network (ANN) may be utilized as long as an optimized cache structure can be designed for the specific application and system as a target.

In the meantime, in order to proceed with the machine learning as described above, an optimal cache structure needs to be determined in advance for every learning application as a correct answer.

The model learning unit 540 learns the cache structure design model by setting a feature matrix of the learning matrix as an input variable and an optimal cache structure as an output variable.

The inference processing unit 54 stores a previously trained cache structure design model and applies a feature matrix according to the memory access pattern of the application which is input to the accelerator 40 to the stored cache structure design model to automatically design an optimal cache structure.

Hereinafter, components included in the inference processing unit 54 according to the exemplary embodiment will be described.

The second memory access information extracting unit 550 may extract a memory address of the cache memory 200 which is accessed by a processing element array 100 at every time stamp, for the input application. Here, the time stamp may be a string which represents or records a specific time. Specifically, the time stamp refers to a time when an event is recorded in a computer.

The processing element array 100 sequentially accesses a plurality of memory addresses over time so that the second memory access information extracting unit 550 acquires information of memory addresses of a storage space accessed by the processing element array 100 at each time stamp.

The second memory access pattern determining unit 560 determines a memory access pattern for the application, based on the access addresses accessed by the processing element array 100 over time.

The memory access pattern may be a tendency or a pattern of the memory address accessed by the processing element array 100 for a specific application, according to the flow of the time stamp. Accordingly, even though the same processing element array 100 accesses the same cache memory 200, the memory access pattern may vary depending on a type of the application.

Further, depending on how to design a configuration for the structure of the cache memory 200 in advance, even though the same processing element array 100 accesses the same cache memory 200 for the same application, the memory access pattern may be totally different.

The second feature matrix generating unit 570 extracts feature information based on a locality of the memory address from the memory access pattern to generate a feature matrix.

Here, the feature matrix may be a feature generated based on features of memory addresses accessed by the processing element array 100 within a predetermined time stamp range, for each of a plurality of reference time stamps. For example, the feature matrix may represent features of how much or frequently the processing element array 100 accesses the storage space of adjacent memory addresses, but is not limited thereto. The feature matrix may be eventually generated one for each application.

Further, the second feature matrix generating unit 570 extracts feature information based on the locality of the memory address for at least one processor group including a plurality of streaming processors of the processing element array 100 to generate a feature matrix.

The cache structure design unit 580 designs a cache structure by inputting a feature matrix for an application to a cache structure design model.

The cache structure design unit 580 designs at least one of a memory hierarchy of the cache memory 200, a capacity of each level storage space of the cache memory 200, a configuration of an associative memory of the cache memory 200, and a policy of the cache memory 200 based on the access pattern, using the cache structure design model.

In the meantime, as a target to be determined or considered when the cache memory structure design unit 580 designs a cache structure of the cache memory 200, it is not necessarily limited to the memory hierarchy, the capacity of each level storage space, the configuration of an associative memory, and the policy of the cache memory 200 which have been described above. Accordingly, as long as the structure of the cache memory 200 is designed using the cache structure design model based on the memory access pattern, any element of the cache memory 200 may be determined during the process of designing a cache memory according to one exemplary embodiment.

Figure 6:
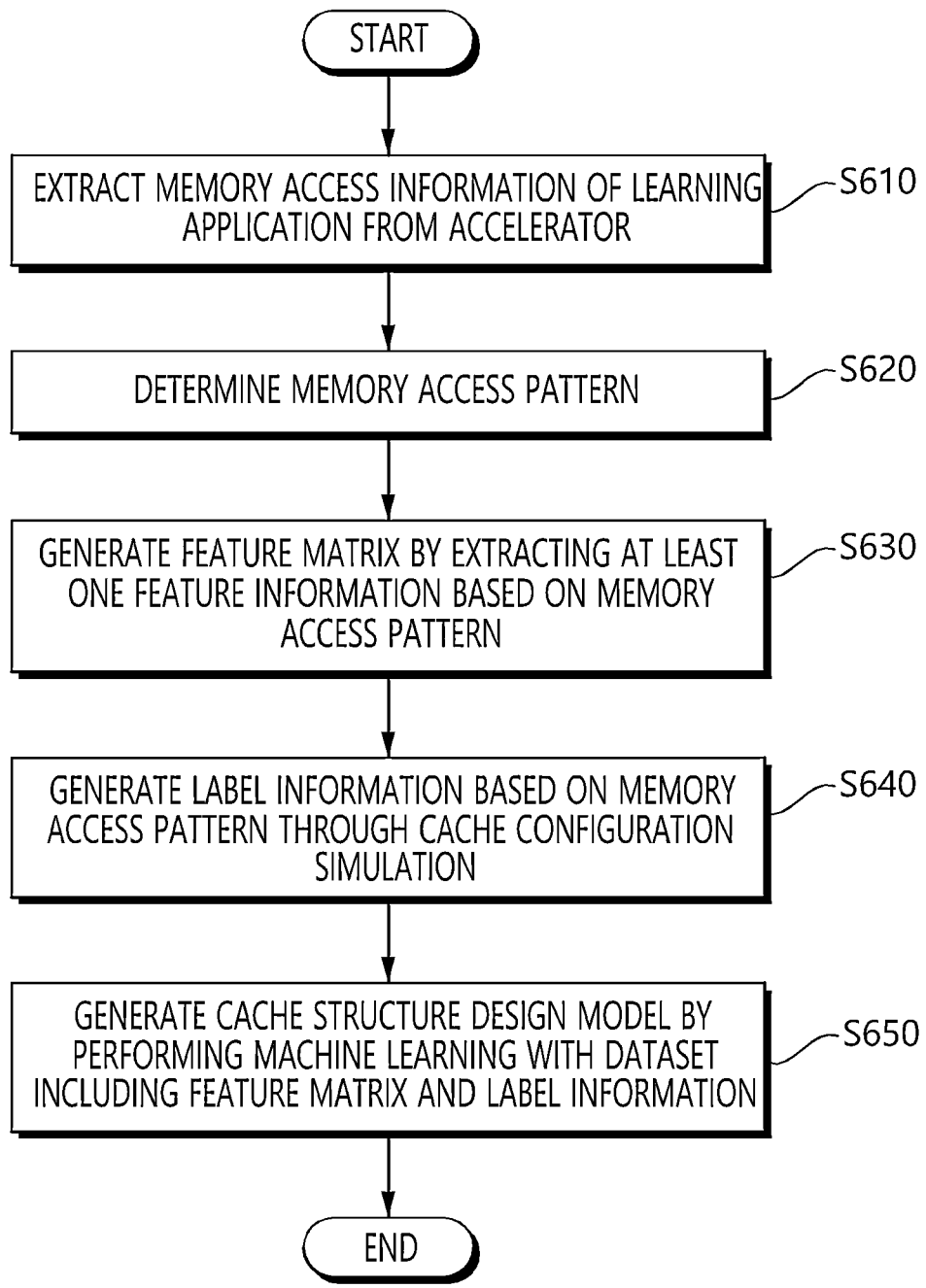
FIGS. 6 and 7 are flowcharts for explaining a cache memory structure designing method according to an exemplary embodiment of the present disclosure.
Figure 7:
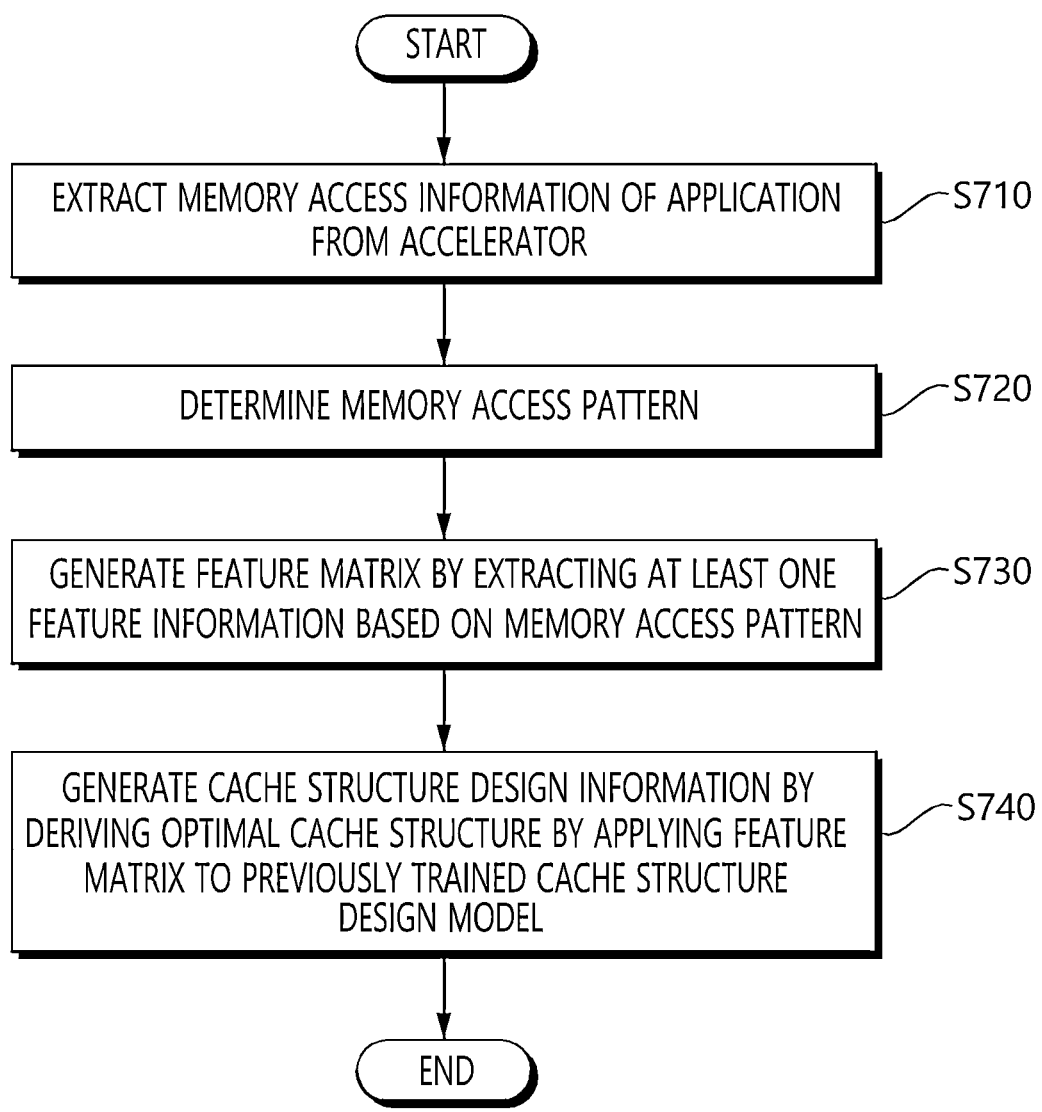

FIGS. 6 and 7 are flowcharts for explaining a cache memory structure designing method according to an exemplary embodiment of the present disclosure.

Referring to FIG. 6, the cache memory structure designing apparatus 50 extracts memory access information of a learning application from an accelerator 40 (S610).

The cache memory structure designing apparatus 50 determines a memory access pattern for the learning application based on a memory address included in the memory access information of the learning application (S620).

The cache memory structure designing apparatus 50 extracts at least one feature information based on a memory access pattern to generate a feature matrix (S630).

The cache memory structure designing apparatus 50 generates label information based on the memory access pattern through cache configuration simulation (S640).

The cache memory structure designing apparatus 50 generates a cache structure design model by performing machine learning with a dataset including a feature matrix and label information (S650).

Referring to FIG. 7, the cache memory structure designing apparatus 50 extracts memory access information of an application from an accelerator 40 (S710).

The cache memory structure designing apparatus 50 determines a memory access pattern for the application based on a memory address included in the memory access information of the application (S720).

The cache memory structure designing apparatus 50 extracts at least one feature information based on a memory access pattern to generate a feature matrix (S730).

The cache memory structure designing apparatus 50 derives an optimal cache structure by applying the feature matrix to the previously trained cache structure design model to generate cache structure design information.

Even though in each of FIGS. 6 and 7, it is described that the steps are sequentially executed, the present disclosure is not necessarily limited thereto. In other words, the steps described in FIGS. 6 and 7 may be modified to be executed or one or more steps may be executed in parallel so that FIGS. 6 and 7 are not limited to a time-sequential order.

The cache memory structure designing method according to the exemplary embodiment described in FIGS. 6 and 7 may be implemented by an application (or a program) and may be recorded in a terminal (or computer) readable recording media. The recording medium which has the application (or program) for implementing the cache memory structure designing method according to the exemplary embodiment recorded therein and is readable by the terminal device (or a computer) includes all kinds of recording devices or media in which computing system readable data is stored.

Figure 8:
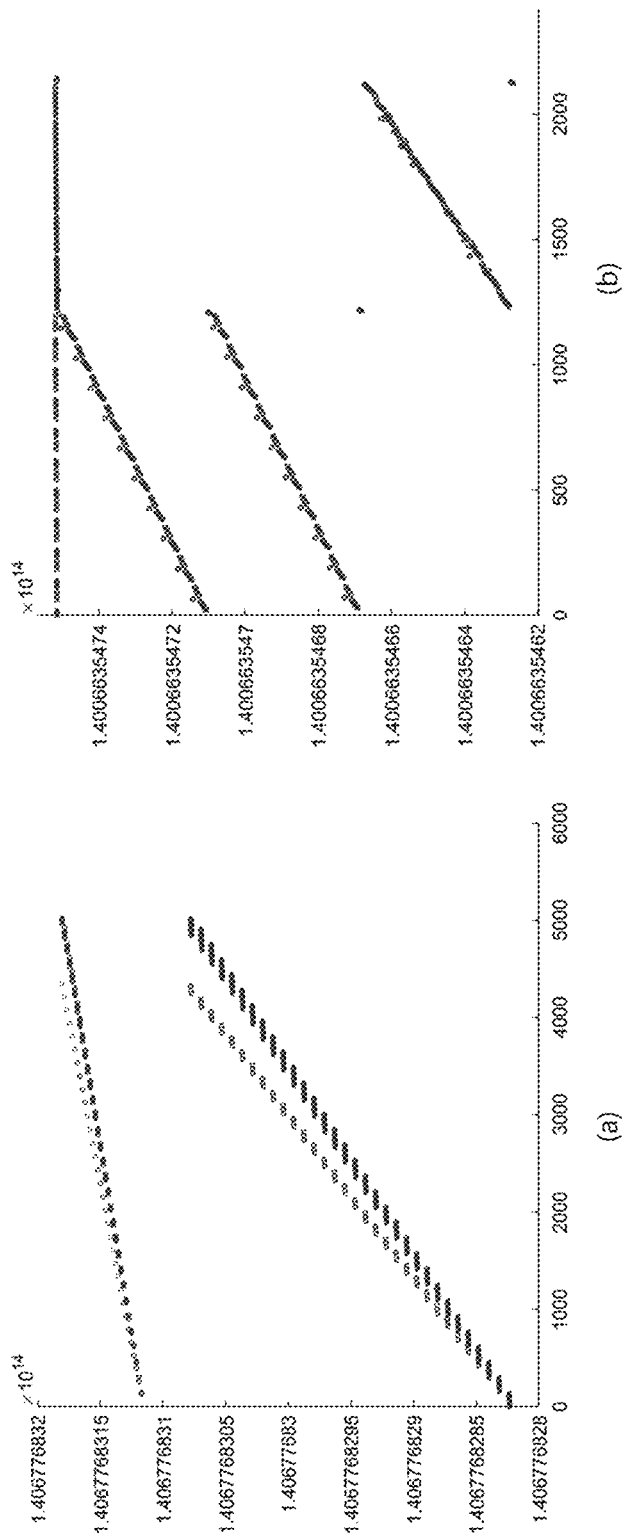
FIG. 8 is a view illustrating a memory access pattern according to an exemplary embodiment of the present disclosure.

FIG. 8 is a view illustrating a memory access pattern according to an exemplary embodiment of the present disclosure.

Referring to FIG. 8, an example of a tendency of a memory address accessed by the processing element array over time is confirmed. That is, an example of the memory access pattern is confirmed.

Two illustrated graphs illustrate a tendency of a memory address accessed by the processing element array 100 for different applications.

Specifically, in the illustrated graphs, the x-axis represents a time stamp and a y-axis represents an address of a memory. At this time when the time stamp changes over time, the memory address of the storage space which is accessed by the processing element array 100 is changed. In some cases, even though the time stamp changes, the processing element array 100 may access a space of the same memory address.

Referring to the tendency of the illustrated graph, that is, the memory access pattern, it is confirmed that as the time stamps are more adjacent, the processing element array 100 accesses the storage space of the more adjacent memory addresses. For example, in an example of the graph of FIG. 8B, it is confirmed that even though the time stamp increases, in a predetermined time stamp range, the processing element array 100 accesses the storage space at a very adjacent memory address and then at a specific time stamp, suddenly accesses a memory address with a predetermined difference, and within a predetermined time stamp range, the processing element array 100 repeatedly accesses a storage space of an adjacent memory address.

As described above, the memory address of the cache memory 300 which is accessed by the processing element array 100 over time has a predetermined locality according to an application. The cache structure design model is trained based a feature related to the locality to allow the cache memory structure design device 50 to design a cache structure for an application using the cache structure design model later.

Figure 9:
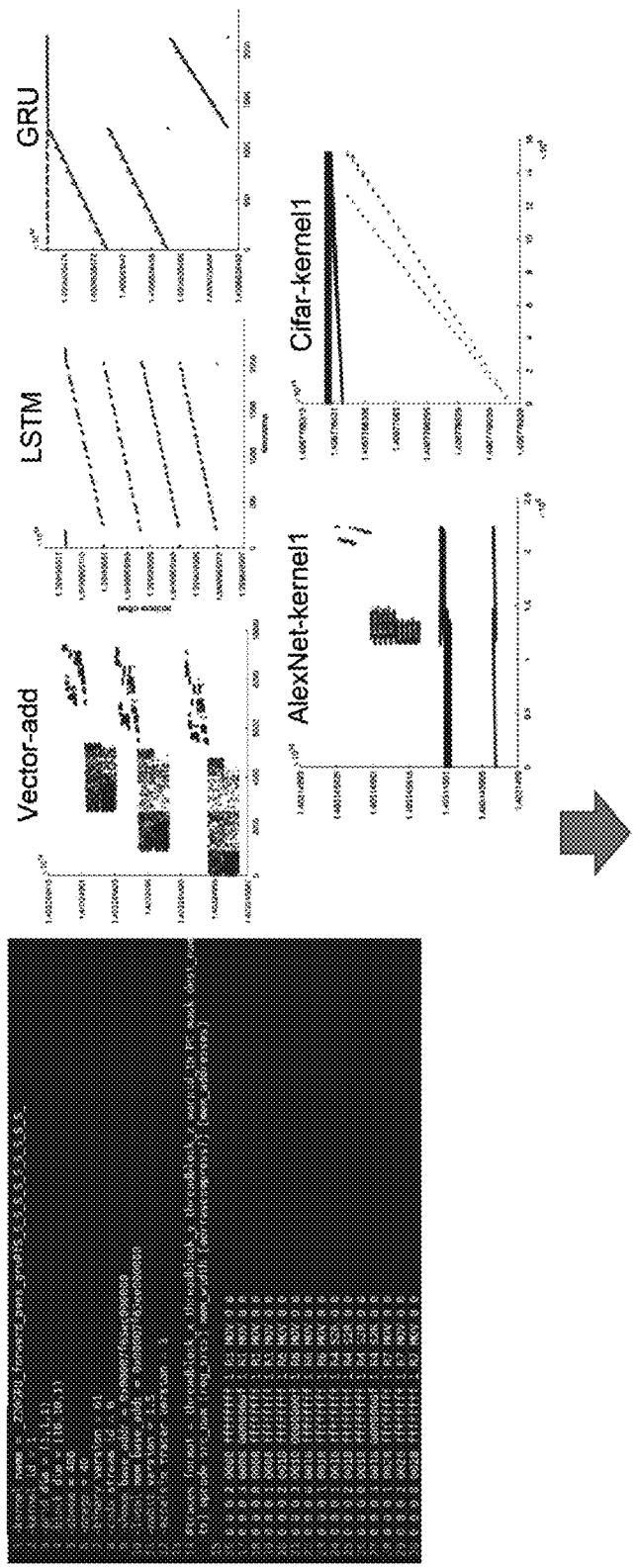
FIGS. 9 and 10 are views for explaining an operation of extracting a feature value for a memory access pattern according to an exemplary embodiment of the present disclosure.
Figure 10:
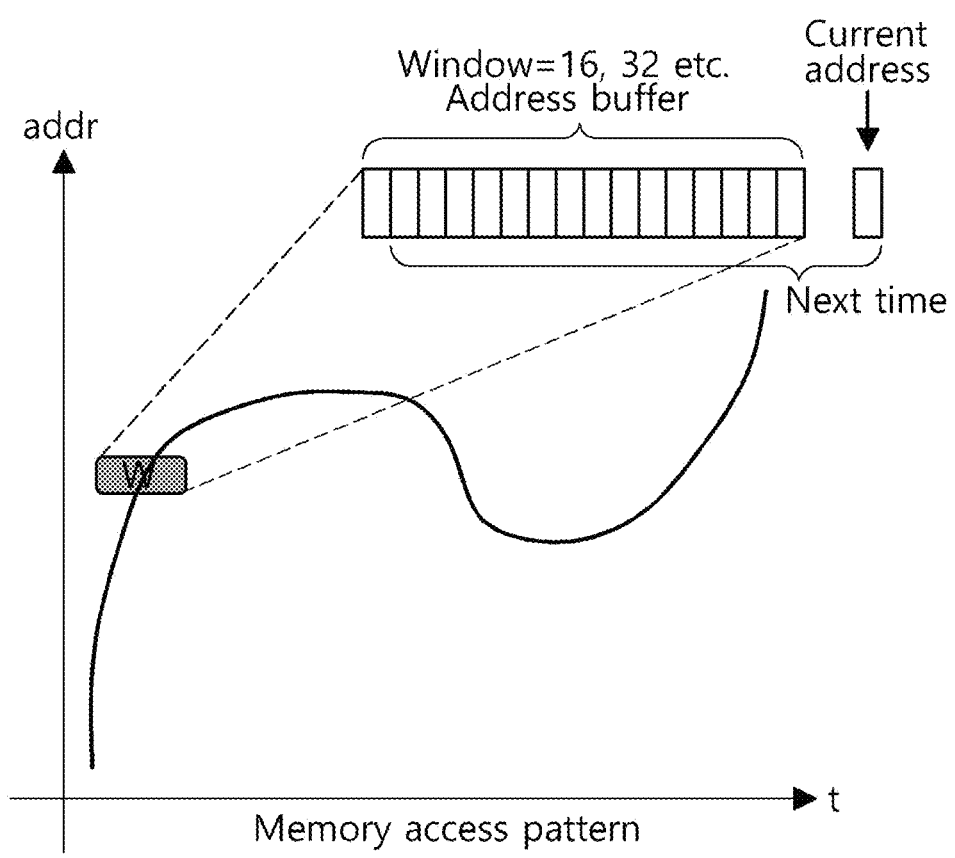

FIGS. 9 and 10 are views for explaining an operation of extracting a feature value for a memory access pattern according to an exemplary embodiment of the present disclosure.

FIG. 9 illustrates an operation of generating a feature matrix by extracting feature information based on a memory access pattern illustrated on the graph.

As illustrated in the graph, every application has a different memory access pattern. Therefore, different feature matrices may be generated for the memory access patterns.

The cache memory structure designing apparatus 50 generates a feature matrix using a spatial locality accessing an adjacent address, a temporal locality accessing the same address, and a locality for every processor group or block according to a characteristic of a hybrid cache memory.

FIG. 10 is a view for explaining a process of extracting feature information according to an exemplary embodiment.

Referring to the graph illustrated in FIG. 10, the time stamp changes over time and at each time stamp, the processing element array 100 may access a storage space at any one memory address.

A reference time stamp (a t value of a current address) is a time stamp indicating a time when the processing element array 100 accesses a memory for an application. Referring to the illustrated graph, it is confirmed that a time stamp at a specific time is determined as a reference time stamp and it is confirmed that a memory address (current address) accessed by the processing element array 100 at the reference time stamp can be utilized.

That is, the reference time stamp may be a time stamp which is a reference required to extract feature information for the application. In the meantime, a plurality of time stamps may be required to extract a feature matrix for any one application.

Specifically, the time stamp may be continuously changed over time and all the time stamps may serve as a reference time stamp in turns.

That is, any one time stamp is used as a reference time stamp to extract feature information for the corresponding time stamp and then the reference time stamp is changed to a time stamp next to the corresponding time stamp to extract feature information for the changed reference time stamp and continuously in this manner, feature information for all the time stamps may be extracted.

In the meantime, not all the time stamps need to be used as a reference time stamp and only some time stamps may be used as the reference time stamp with a predetermined rule.

The feature information is information related to a feature determined according to the memory access pattern of the processing element array 100 for each time stamp. The feature information may vary depending on which criteria is used by the user to define and various features may be determined as feature information.

Figure 11:
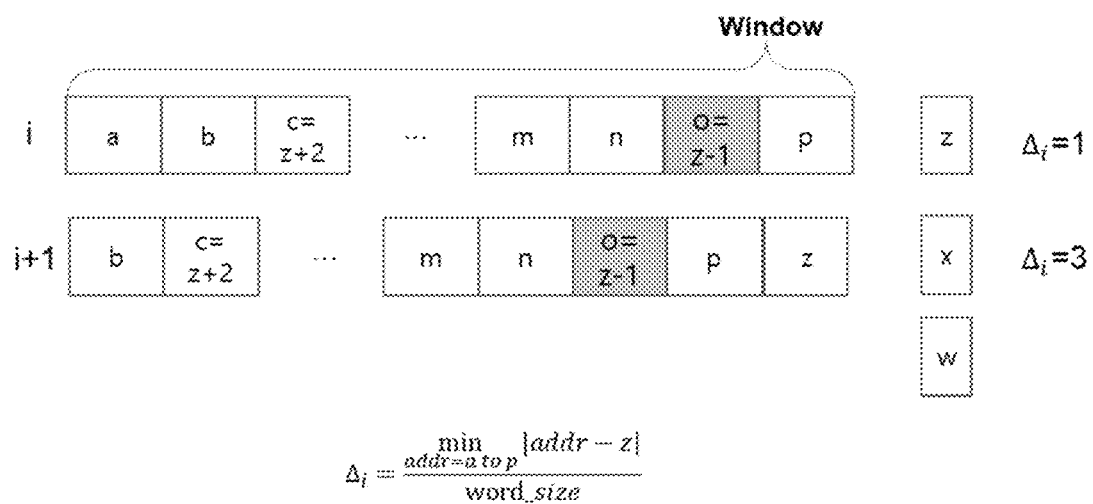
FIG. 11 is a view for explaining an operation of generating a first feature matrix based on a memory access pattern according to an exemplary embodiment of the present disclosure.

FIG. 11 is a view for explaining an operation of generating a first feature matrix based on a memory access pattern according to an exemplary embodiment of the present disclosure.

Referring to FIG. 11, feature information of any one reference time stamp is determined based on a difference between a memory address accessed at a plurality of consecutive time stamps (window) and a memory address accessed at the reference time stamp.

The cache memory structure designing apparatus 50 may extract a least difference memory address (o).

The least difference memory address o is a memory address with a least difference from a memory address access by the processing element array 100 at the reference time stamp, among memory addresses accessed by the processing element array 100 at a plurality of consecutive time stamps (window).

For example, when a memory address accessed by the processing element array 100 at the reference time stamp is z, a memory address which has the least difference from z, among the memory addresses a, b, c, . . . m, n, o, and p accessed by the processing element array 100 at a plurality of consecutive time stamps (window) is o which has a difference of 1 and the others have a difference of 2 or larger so that o is the least difference memory address o for the reference time stamp.

The cache memory structure designing apparatus 50 determines memory address least difference information for the reference time stamp by calculating a difference between a memory address accessed at the reference time stamp and the least difference memory address o.

For example, when the memory address accessed by the processing element array 100 at the reference time stamp is z and o which has a difference of 1 from z is the least difference memory address o, the feature information extracting unit 131 determines 1 as memory address least difference information for the reference time stamp.

The cache memory structure designing apparatus 50 collects memory address least difference information for all the reference time stamps to generate a feature matrix 601 for the application.

That is, there are memory address least difference information corresponding to every reference time stamp and the cache memory structure designing apparatus 50 may generate the feature matrix 601 for the application by collecting and statistically organizing the information.

For example, as a result of collecting memory address least difference information for thousands or tens of thousands of reference time stamps, there may be 5050 reference time stamps with memory address least difference information of 0, 1222 reference time stamps with memory address least difference information of 1, and 3 reference time stamps with memory address least difference information of 2 and the feature matrix 601 may be generated based on the statistical value.

Figure 12:
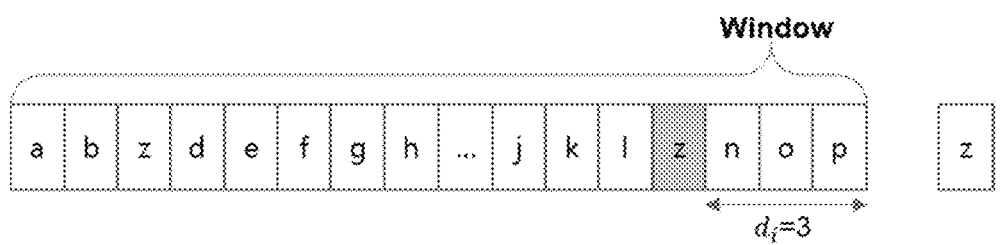
FIG. 12 is a view for explaining an operation of generating a second feature matrix based on a memory access pattern according to an exemplary embodiment of the present disclosure.

FIG. 12 is a view for explaining an operation of generating a second feature matrix based on a memory access pattern according to an exemplary embodiment of the present disclosure.

Referring to FIG. 12, feature information of any one reference time stamp is determined based on a number of time stamps of accessing the same memory address as a memory address accessed at the reference time stamp, among a plurality of consecutive time stamps (window).

The cache memory structure designing apparatus 50 extracts first number information. The first number information is information about a number of time stamps of accessing the same memory address as a memory address accessed at the reference time stamp, among a plurality of consecutive time stamps (window).

For example, when a memory address accessed by the processing element array 100 at the reference time stamp is z, a number of time stamps accessing the same memory address as the memory address z accessed at the reference time stamp, among the memory addresses a, b, z, d, e, f, g, h, . . . j, k, l, z, n, o, and p accessed by the processing element array 100 at a plurality of consecutive time stamps (window) is 2, so that the cache memory structure designing apparatus 50 determines 2 as the first number information for the reference time stamp.

The cache memory structure designing apparatus 50 collects the first number information for all the reference time stamps to generate a feature matrix 602 for the application.

That is, there are first number information corresponding to every reference time stamp and the feature matrix generating unit 132 may generate the feature matrix 602 for the application by collecting and statistically organizing the information.

For example, as a result of collecting the first number information for thousands or tens of thousands of reference time stamps, there may be 44 reference time stamps with the first number information of 1, 3322 reference time stamps with the first number information of 2, and 123 reference time stamps with the first number information of 3 and the feature matrix 602 may be generated based on the statistical value.

Figure 14:
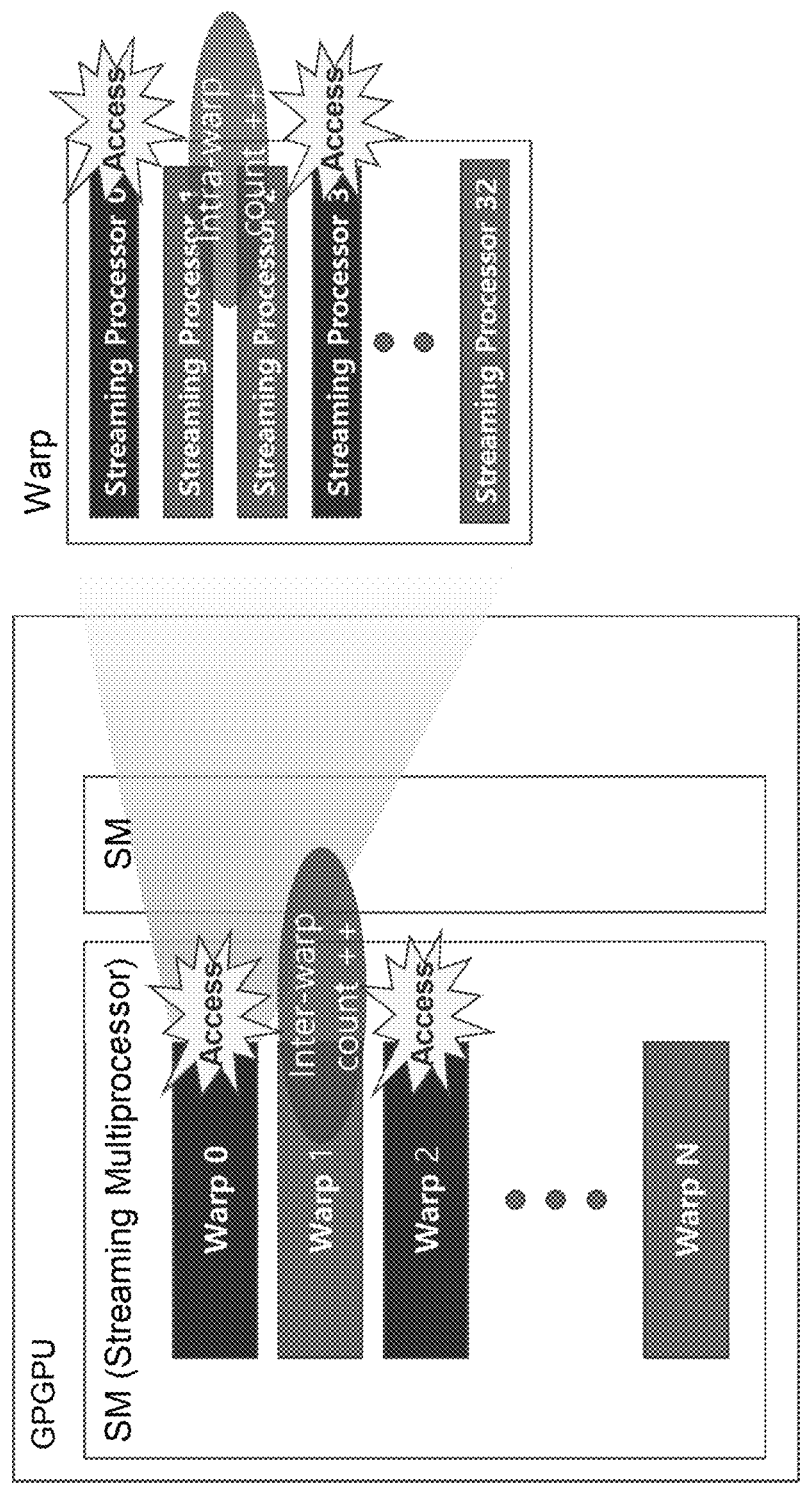

FIGS. 13 and 14 are views for explaining an operation of generating a third feature matrix based on a memory access pattern according to an exemplary embodiment of the present disclosure.

The cache memory structure designing apparatus 50 extracts feature information based on a locality of the memory address for at least one processor group including a plurality of streaming processors to generate a feature matrix.

The cache memory structure designing apparatus 50 extracts feature information about at least one access count, among an access count for a memory address which is accessed only once and then discarded, an access count obtained by counting memory addresses for accessing between at least one processer group, and an access count obtained by counting memory addresses for accessing the streaming processor in the processor group and collects the feature information to generate the feature matrix for the application.

The cache memory structure design device 50 extracts feature information about an operation of reading or writing at a memory address accessed by the processor group and about the access count for the frequency of reading or writing at the memory address accessed by the processor group to generate the feature matrix.

For example, the cache memory structure designing apparatus 50 analyzes the locality for every warp according to a characteristic of a SRAM-MRAM hybrid cache memory to extract the feature information.

Figure 15:
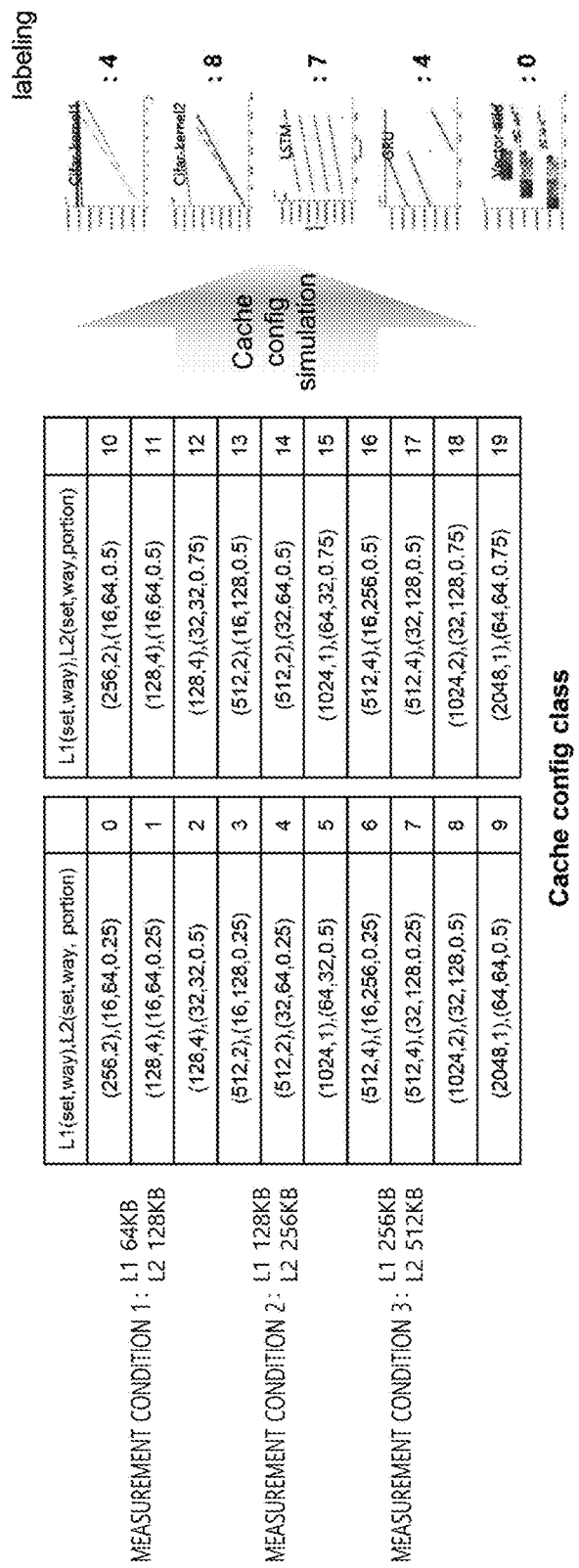
FIG. 15 is a view for explaining an operation of generating label information for training a cache structure design model according to an exemplary embodiment of the present disclosure.

In FIG. 15, Streaming refers to an address which is accessed only once and then discarded and Inter-warp is a value (L1 cache) which identifies access between warps and Intra-warp is a value (Le cache) which identifies access in the warp.

The cache memory structure designing apparatus 50 identifies a reading or writing operation for a memory address at the locality of Intra-warp and identifies the frequency of reading or writing at the memory address of the locality of the Intra-warp to extract the SRAM-MRAM feature information.

Due to the characteristic of the GPU in which a plurality of warps simultaneously turns in the accelerator 40, in order to analyze the locality of the cache, the locality for every warp needs to be analyzed. That is, the localities of Inter-warp and Intra-warp are analyzed to identify the characteristic of the locality of a benchmark.

FIG. 15 is a view for explaining an operation of generating label information for training a cache structure design model according to an exemplary embodiment of the present disclosure.

The cache memory structure designing apparatus 50 generates label information labeled to the memory access pattern by simulating the measurement of a performance for every configuration of the cache structure. Here, the label information is information in which a level value obtained by measuring the performance is assigned to every memory access pattern for every application.

The cache memory structure designing apparatus 50 measures the performance by applying configurations of various cache structures and performs the labeling to label the learning dataset.

It will be appreciated that various exemplary embodiments of the present disclosure have been described herein for purposes of illustration, and that various modifications and changes may be made by those skilled in the art without departing from the scope and spirit of the present invention. Accordingly, the exemplary embodiments of the present disclosure are not intended to limit but describe the technical spirit of the present invention and the scope of the technical spirit of the present invention is not restricted by the exemplary embodiments. The protective scope of the embodiment of the present disclosure should be construed based on the following claims, and all the technical concepts in the equivalent scope thereof should be construed as falling within the scope of the embodiment of the present disclosure.

What is claimed is:

1. A cache memory structure designing method for designing a structure of a cache memory of an accelerator, in a cache memory structure designing apparatus, the method comprising:
a memory access information extracting step of extracting a memory address of a cache memory accessed by a processing element array (PE array) at every time stamp for an application input to the accelerator;
a memory access pattern determining step of determining a memory access pattern for the application based on the memory addresses of the cache memory accessed over time; and
a cache structure design step of deriving a cache memory structure using a cache structure design model trained in advance based on a memory access pattern and generating cache structure design information for the cache memory structure.

2. The cache memory structure designing method according to claim 1, further comprising:
a feature matrix generating step of generating a feature matrix by extracting feature information based on a locality of the memory address from the memory access pattern,
wherein in the cache structure design step, the cache memory structure is designed by inputting the feature matrix for the application to the cache structure design model.

3. The cache memory structure designing method according to claim 2, wherein in the feature matrix generating step, the feature matrix for the application feature is generated by extracting information about a plurality of reference time stamps indicating a timing when the processing element array accesses the cache memory, for the application and collecting feature information about all the reference time stamps.

4. The cache memory structure designing method according to claim 3, wherein in the feature matrix generating step, a first feature matrix for the application is generated by extracting a memory address with a least difference from a memory address accessed at a reference time stamp, among memory addresses accessed at a plurality of consecutive time stamps and collecting least difference information about a difference between the memory address accessed at the reference time stamp and the least difference memory address.

5. The cache memory structure designing method according to claim 3, wherein in the feature matrix generating step, a second feature matrix for the application is generated by extracting first number information about a number of time stamps accessing a same memory address as a memory address accessed at a reference stamp, among a plurality of consecutive time stamps and collecting the first number information about all the reference time stamps.

6. The cache memory structure designing method according to claim 3, wherein in the feature matrix generating step, a third feature matrix is generated by extracting feature information based on a locality of the memory address for at least one processor group including a plurality of streaming processors.

7. The cache memory structure designing method according to claim 6, wherein in the feature matrix generating step, the third feature matrix for the application is generated by extracting feature information about at least one access count, among an access count for a memory address which is accessed only once and then discarded, an access count obtained by counting memory addresses for accessing between at least one processor group, and an access count obtained by counting memory addresses for accessing a streaming processor in the processor group and collecting the feature information.

8. The cache memory structure designing method according to claim 7, wherein in the feature matrix generating step, the third feature matrix is generated by extracting feature information about an operation of reading or writing at a memory address accessed by the processor group and about the access count for a frequency of reading or writing at the memory address accessed by the processor group.

9. The cache memory structure designing method according to claim 5, wherein in the feature matrix generating step, a feature matrix for the application is generated by any one or a combination of two or more of the first feature matrix, the second feature matrix, and a third feature matrix.

10. A cache memory structure designing apparatus for designing a structure of a cache memory of an accelerator, comprising:
- a memory access information extracting unit which extracts a memory address of a cache memory accessed by a processing element array (PE array) at every time stamp for an application input to the accelerator;
- a memory access pattern determining unit which determines a memory access pattern for the application based on the memory addresses of the cache memory accessed over time; and
- a cache structure design unit which derives a cache memory structure using a cache structure design model trained in advance based on a memory access pattern and generates cache structure design information for the cache memory structure.

11. The cache memory structure designing apparatus according to claim 10, further comprising:
- a feature matrix generating unit which generates a feature matrix by extracting feature information based on a locality of the memory address from the memory access pattern,
- wherein the cache structure design unit designs the cache memory structure by inputting the feature matrix for the application to the cache structure design model.

12. The cache memory structure designing apparatus according to claim 11, wherein the feature matrix generating unit generates the feature matrix for the application feature by extracting information about a plurality of reference time stamps indicating a timing when the processing element array accesses the cache memory, for the application and collecting feature information about all the reference time stamps.

13. An accelerator system, comprising:
- a memory,
- a host processor which controls execution of an application in an accelerator;
- an accelerator which includes a processing element array (PE array) which performs an operation processing for the application and a cache memory interworking with the processing element array; and
- a cache memory structure designing apparatus including: a memory access information extracting unit which extracts a memory address of a cache memory accessed by a processing element array (PE array) at every time stamp for an application input to the accelerator, a memory access pattern determining unit which determines a memory access pattern for the application based on the memory addresses of the cache memory accessed over time; and a cache structure design unit which derives a cache memory structure using a cache structure design model trained in advance based on a memory access pattern and generates cache structure design information for the cache memory structure.

* * * * *